United States Patent [19]

Kawamura et al.

[11] Patent Number: 4,693,582
[45] Date of Patent: Sep. 15, 1987

[54] AUXILIARY LIGHT SOURCE FOR CAMERA HAVING AUTOMATIC FOCUSING DEVICE

[75] Inventors: Masaharu Kawamura; Akira Hiramatsu, both of Kanagawa, Japan

[73] Assignee: Canon Kabushiki Kaisha, Tokyo, Japan

[21] Appl. No.: 858,544

[22] Filed: Apr. 29, 1986

Related U.S. Application Data

[63] Continuation of Ser. No. 459,674, Jan. 20, 1983, abandoned.

[30] Foreign Application Priority Data

Feb. 2, 1982 [JP] Japan ................... 57-15143
Feb. 2, 1982 [JP] Japan ................... 57-15148

[51] Int. Cl.⁴ ............................ G03B 3/00; G03B 7/00
[52] U.S. Cl. ................................ 354/403; 354/145.1; 354/413
[58] Field of Search ................ 354/81, 126, 129, 132, 354/141, 145.1, 288, 295, 403, 413, 415, 429

[56] References Cited

U.S. PATENT DOCUMENTS

| | | | |
|---|---|---|---|
| 2,682,603 | 6/1954 | Dine et al. | 354/145.1 |
| 3,367,253 | 2/1968 | Kuhns et al. | 354/145.1 |
| 3,813,679 | 5/1974 | Hasegawa et al. | 354/403 |
| 3,836,919 | 9/1974 | Matsumoto et al. | 354/403 |
| 4,030,114 | 6/1977 | Telfer | 354/295 |
| 4,032,934 | 6/1977 | Hendrickson et al. | 354/403 |
| 4,067,028 | 1/1978 | Lermann et al. | 354/145.1 |
| 4,095,241 | 6/1978 | Matsumoto | 354/403 |
| 4,095,242 | 6/1978 | Tsunekawa et al. | 354/413 |
| 4,350,418 | 9/1982 | Taguchi et al. | 354/403 |
| 4,365,878 | 12/1982 | Takuda et al. | 354/403 |
| 4,410,261 | 10/1983 | Masunaga et al. | 354/403 |
| 4,423,936 | 1/1984 | Johnson | 354/403 |

Primary Examiner—L. T. Hix
Assistant Examiner—David M. Gray
Attorney, Agent, or Firm—Toren, McGeady & Associates

[57] ABSTRACT

An auxiliary light source for a camera having an automatic focusing device as an adapter attachable to a shoe part of the camera and which inhibits light measuring action during an auxiliary light emitting action for always obtaining accurate light measurement. The arrangement solves the following problems. In a camera of this type, the output of an automatic focusing sensor becomes too low for automatic focusing when automatic focusing is to be carried out under low light conditions. Systems contrived by the prior art to solve this problem have an auxiliary light source disposed within the camera for illuminating an object to be photographed during automatic focusing. However, since the auxiliary light source device is included within the camera, the auxiliary light is not effectively utilizable when a large lens such as a telephoto lens is used, since the auxiliary light is eclipsed by the lens barrel. Furthermore, when a light measuring circuit is operated during illumination by an auxiliary light, the light measurement output obtained for control would be affected by the illumination light making accurate light measurement almost unobtainable.

34 Claims, 6 Drawing Figures

# AUXILIARY LIGHT SOURCE FOR CAMERA HAVING AUTOMATIC FOCUSING DEVICE

This is a continuation of application Ser. No. 459,674, filed Jan. 20, 1983, now abandoned.

BACKGROUND OF THE INVENTION

1. Field of the Invention

This invention relates to an auxiliary illumination device to be mounted on a photographic camera for illuminating an object to be photographed and, more particularly, to an illumination device adapted for distance measurement by a camera automatic focusing device when the brightness of the object is low.

2. Description of the Prior Art

Figure 1:
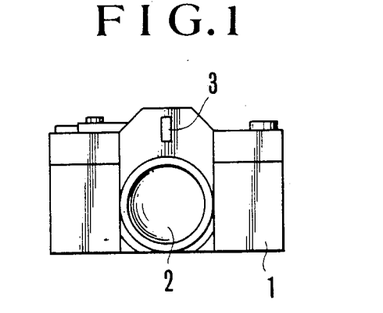
FIG. 1 is a front view showing by way of example a conventional method for mounting an auxiliary illumination device.
Figure 2:
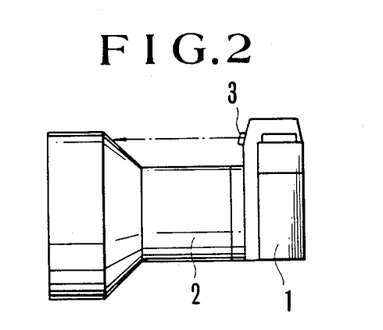
FIG. 2 is a side view of the camera shown in FIG. 1.
Figure 3:
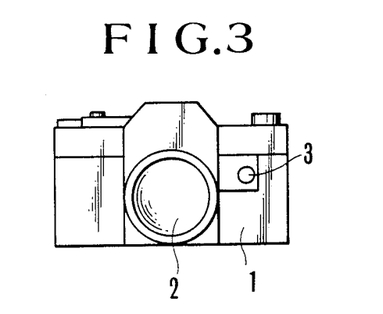
FIG. 3 is a front view showing another conventional mounting method.

Heretofore, there have been proposed various kinds of cameras of the type using a device for automatic focusing (hereinafter called AF). However, the distance measuring power of such AF devices is generally limited. It is particularly difficult to have them perform an AF action on an object of low brightness. To solve this problem, there have also been proposed various improvements. None of these proposed improvements, however, has been satisfactory. In one of these prior art methods, the camera is equipped with an auxiliary illumination device and an object, at the distance which is to be measured, is illuminated, if necessary, from the camera. In other words, a light beam is emitted from the camera in the direction of the optical axis thereof. FIGS. 1, 2 and 3 of the accompanying drawings show some examples of the prior art methods for equipping a camera with such an auxiliary illumination devices for AF. In FIG. 1, an auxiliary illumination device is disposed in front of a pentaprism. This arrangement, however, makes the size of the pentaprism larger and it is not suitable for a camera which must be of a compact size. Besides, in the case of a single lens reflex camera, there is the possibility that an auxiliary light thus obtained might be eclipsed or shade by a lens barrel, as shown in FIG. 2, when a large aperture lens such as a telephoto lens or the like is mounted on the camera. A method of arranging the auxiliary illumination device in the neighborhood of a camera lens, as shown in FIG. 3, not only results in an increased camera size but also incurs the fear of having the auxiliary light eclipsed when a telephoto lens of a large aperture is mounted on the camera. Furthermore, the method of FIG. 3 has another disadvantage in respect to operability as it imposes some restriction on the manner in which the camera can be hand held during photography. As will be understood from the above, is is inevitable that the camera size be greater with an auxiliary illumination device provided on the camera body, in accordance with the methods of the prior art.

The AF camera using an auxiliary illumination device of the above stated type further presents the following problem. While the AF mechanism of the camera is in operation, if either the brightness of the object to be photographed is measured or an aperture or shutter speed is computed concurrently, illumination with auxiliary light would give an erroneous brightness measurement and thus would result in an inadequate exposure. To solve this problem, there is a method of using an auxiliary light that is outside the photosensitive spectrum range for a light sensitive element, such as near infrared rays. However, it is impossible to completely remove infrared rays with any photometric infrared cutting filters that are presently available. Furthermore, when this auxiliary illumination light is emitted during photography, the film would be affected by undesirable illumination if film that is sensitive to the auxiliary light is used.

SUMMARY OF THE INVENTION

It is an object of this invention to provide a compact and lightweight auxiliary illumination device which is discretely arranged as an attachment or an accessory to be attachable to and detachable from the camera. With the auxiliary illumination device attachable to the camera as an accessory thereof, the device can be easily positioned away from the photo-taking optical axis, so that the above problem of having the auxiliary light flux eclipsed by a lens barrel, when a telephoto lens of a large aperture is mounted on the camera, can be effectively solved.

It is another object of the invention to provide an auxiliary illumination device which is not only an attachment to a camera but is also an adapter to permit a flash device to be mounted thereon, so that flash photography can be accomplished even with the auxiliary illumination device attached to the camera.

It is a further object of the invention to provide an auxiliary illumination device for distance measurement which becomes inoperative during the light measuring or photo-taking operation of a camera and which also inhibits the light measuring operation during the auxiliary light emitting action of the device, so that the above-mentioned problem of inaccurate light measurement can be solved.

It is a further object of the invention to provide an auxiliary illumination device which intermittently emits an auxiliary light when the device is in operation, so that power consumption can be reduced and the load on a power source lessened.

It is still a further object of the invention to provide an auxiliary illumination device which is rendered operative only when a storage type AF sensor such as a CCD sensor is in the process of a storing action and when the brightness of an object to be photographed is low when such a sensor is used.

These and further objects and features of the invention will become apparent from the following detailed description of embodiments thereof taken in conjunction with the accompanying drawings.

DESCRIPTION OF THE PREFERRED EMBODIMENTS

Figure 4:
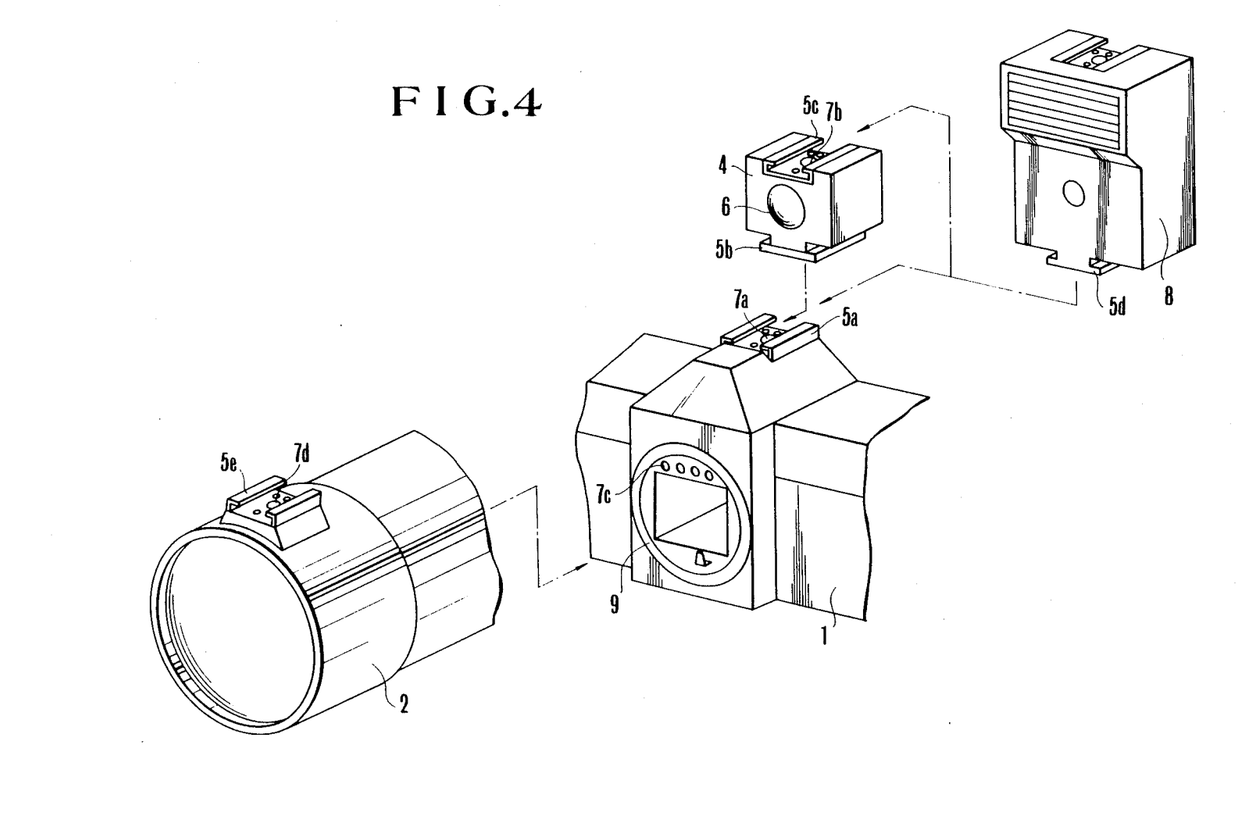
FIG. 4 is an oblique view showing a method for mounting an auxiliary illumination device on a camera in an embodiment of the present invention.

Referring to FIG. 1 which is an oblique view showing an auxiliary illumination device as an embodiment of the invention, reference numeral 1 indicates a camera body. A photo-taking lens 2 is mounted on a mount 9 of the camera body 1 by a known method. On the fore end of a lens barrel of the photo-taking lens 2 is provided an accessory shoe 5e for mounting an auxiliary illumination device 4. The auxiliary illumination device 47 in accordance with the invention serves as auxiliary light adapter and is provided with a mount part 5b attached to an accessory shoe 5a of the camera body 1 and another mount part 5c which permits other accessories such as a flash device, a remote control relese device, etc., to be mounted on the auxiliary illumination device 4. In this embodiment as illustrated in FIG. 4, the mount part 5a also serves as the conventional accessory shoe. However, the mount part 5a may be separate from the conventional accessory shoe. The auxiliary illumination device or auxiliary light adapter 4 is provided with an auxiliary light emitting part 6, which has an auxiliary light beam emitted in the direction of an optical axis by means of a light emitting element or a flash device toward an object to be photographed. The mount part 5a of the camera body 1 is provided with a signal pin 7a for controlling the light emission of the auxiliary light adapter 4 or for controlling other accessories. The signal pin 7a conductively connects with a contact which is not shown but is provided on the mount part 5b of the auxiliary light adapter 4 in such a way as to effect signal exchange therewith. The mount part 5c of the auxiliary light adapter 4 is provided with a signal pin 7b which effects signal exchange with other accessories for controlling them, when they are mounted on the adapter 4. Another signal pin 7d, which performs a similar function, is provided on the accessory shoe 5e disposed at the fore end part of the photo-taking lens. Meanwhile, a mount 9 of the camera body 1 is provided with signal pins 7c which effect control signal exchange with signals pins of the lens barrel through contacts provided on the lens 2 side. A reference numeral 8 indicates a known flash device which is attachable either to the accessory shoe 5a of the camera body 1 or to the mount part 5c of the auxiliary light adapter 4.

Figure 5:
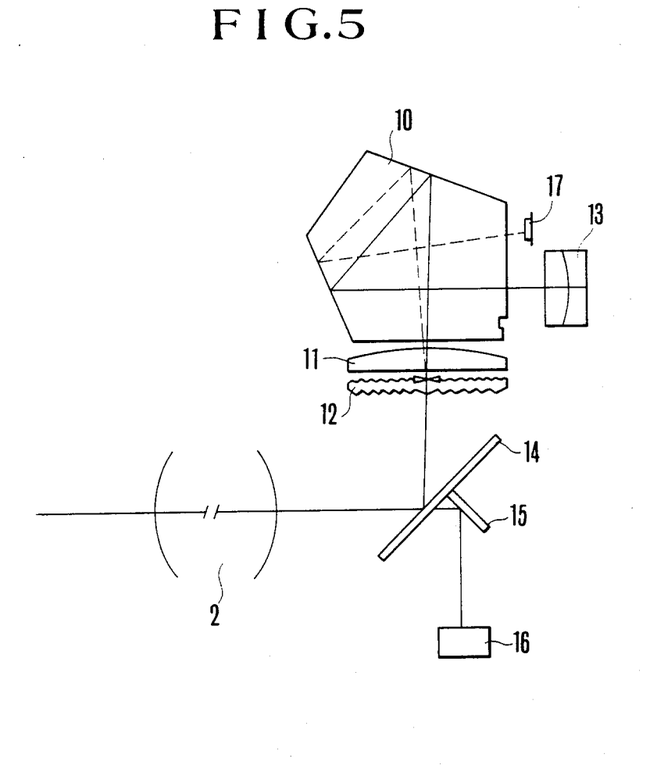
FIG. 5 is a sectional schematic illustration showing the optical system of a single lens reflex camera equipped with an AF device.

Referring to FIG. 5, which is a sectional view of a single lens reflex camera, the camera includes a pentaprism 10, a condenser lens 11, a reticle 12, an eyepiece 13 and a main mirror 14 which is either partially or entirely composed of a half mirror. These parts constitute a known viewfinder optical system. Behind the main mirror 14 is disposed an auxiliary mirror 15. A sensor 16 for automatic focusing is disposed in a conjugate position relative to the reticle 12 of the camera. A focusing state is detected through a light flux which passes through the half mirror part of the main mirror 14 and is reflected by the auxiliary mirror 15 to be received by the sensor 16 which is in the conjugate position with the reticle 12 of the camera. Both the main mirror 14 and the auxiliary mirrors 15 are moved upward by a known quick return mechanism during a photo-taking process. Through-the-lens (TTL) light measurement is accomplished with a light sensitive element which is provided for exposure control. As shown in FIG. 4, the auxiliary light adapter 4 is mountable either on the camera body 1, on the lens 2 or on the flash device 8. With the flash device 8 mounted on the camera body 1, the auxiliary light adapter 4 can be mounted on top of the flash device 8. Conversely, the flash device 8 can be mounted on top of the auxiliary light adapter 4 after the latter has been mounted on the camera body 1.

Figure 6:
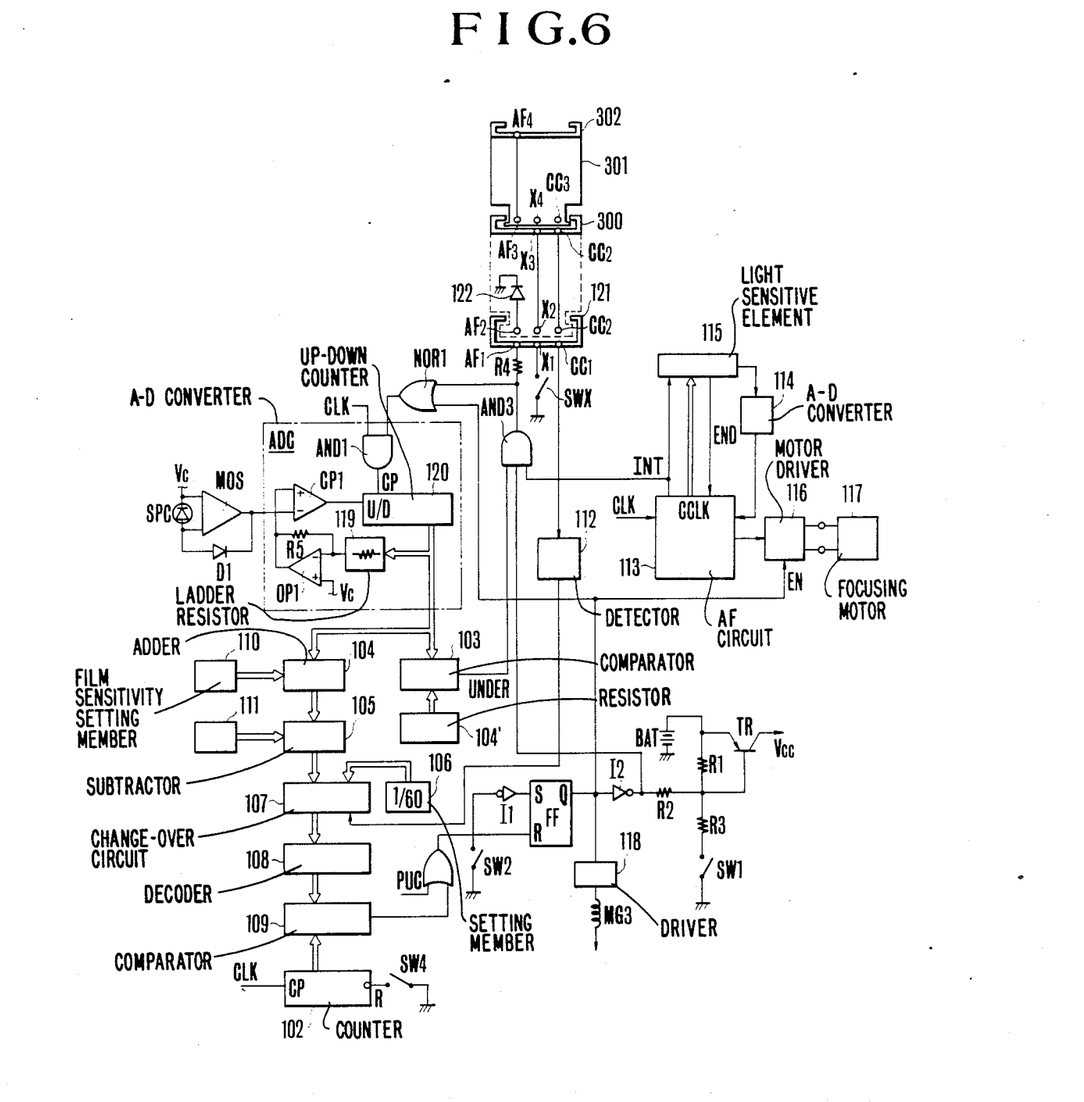
FIG. 6 is a circuit diagram showing an embodiment of the circuit arrangement of an AF camera which permits an auxiliary illumination device of the invention to be mounted thereon.

FIG. 6 is a circuit diagram showing by way of example the circuit arrangement of an automatic focusing type camera which permits mounting of the auxiliary illumination device 4 according to the present invention. The circuit arrangement of FIG. 6 and the operation thereof are as described below.

Referring to FIG. 6, the circuit includes a light measuring light sensitive element SPC; an amplifier MOS which is of a high input impedance and which has its output logarithmically suppressed by a diode D1; a constant voltage source, which is not shown, impresses a constant voltage on the amplifier MOS; and an A-D converter which converts a light measurement analog signal from the amplifier MOS into a digital signal. The converter includes a comparator CP1, an operational amplifier OP1; an up-down counter 120; a ladder resistor 119; an AND gate AND 1 and a resistor R5. This is an A-D converter of known arrangement using a D-A converter. With the input signal A-D converted, a digital value thus obtained is kept in the form of a binary code at the up-down counter 120. Clock pulses produced from a clock pulse generator, which is not shown, is supplied to the up-down counter 120 through the AND gate AND 1. The digital value which is produced from the up-down counter 120, which represents the brightness of an object to be photographed, is supplied to one input terminal of a comparator 103. The other input terminal of the comparator 103 has a resistor 104' connected thereto. At the resistor 104', there is set a predetermined digital value which corresponds to a brightness value limit of the object whose brightness is too low to be detectable by a light sensitive element for automatic focusing (such as CCD). Such being the arrangement, a light brightness warning value is constantly supplied to the comparator 103. When the light measurement value of the up-down counter 120 becomes lower than this low brightness value, the output level UNDER of the comparator 103 becomes high.

The output of the up-down counter 120 is also supplied to one of the input terminals of a digital adder 104. The other input terminal of the digital adder 104 receives a digital output corresponding to a set film sensitivity value from a film sensitivity setting member 110 which is composed of, for example, a digital code plate, etc., which is responsive to a film sensitivity setting dial. The brightness Bv which is set as a digital value from the up-down counter 120 and film sensitivity Sv which is set as a digital value from the film sensitivity setting member 110 are subjected to an A.P.E.X. computation (addition) to obtain an exposure value Ev (Bv+Sv) as the output of the adder 104. The output of the adder 104 is supplied to one of the input terminals of a subtractor 105. Meanwhile, the other input terminal of the subtractor 105 receives a digital value which corresponds to a preset aperture value Av and is produced from a switch member 111, which is responsive to the diaphragm of the lens 2. An A.P.E.X. computation of EV−Av is performed by the subtractor 105. The output, $Ev-Av=Tv$ which is a shutter time value, of the subtractor 105 is then supplied to a changeover circuit 107. The changeover circuit 107 is formed by a data selector and is arranged in the following manner. A signal produced at the camera upon completion of a charging process on a main capacitor of a flash device is detected by a detector 112 which is, for example, formed by a comparator. In response to the output of the detector 112, the changeover circuit 107 shifts the output mode thereof from the output mode of the subtractor 105 to that of a setting member 106, composed of a resistor which includes a digital value corresponding to a shutter time value for flash photography, such as 1/60 sec. The digital value output of the setting member 106 is produced by the changeover circuit 107. This output of the changeover circuit 107 is applied to a decoder 108 to change the logarithmically suppressed binary value into an expanded value. This value is then supplied to a comparator 109. While the expanded value is supplied to one of the input terminals of the comparator 109, the output of the up-down counter 120 is supplied to the other input terminal. The reset terminal of the up-down counter 120 is connected to a switch SW4 which is interlocked with the leading curtain of a camera shutter. The switch SW4 turns off when the leading shutter curtain begins to travel. With the switch SW4 thus turning off, the up-down counter 120 begins to count clock pulses CLK. The output level of the comparator 109 becomes high when the count value thus obtained agrees with the expanded value of the decoder 108. The signal thus produced from the comparator 109 is supplied to the reset terminal R of a flip-flop FF.

The set terminal S of this flip-flop FF is connected to a release button switch SW2 of the camera through an inverter I1. When a release action begins, the switch SW2 turns on, setting the flip-flop FF. The flip-flop FF is reset by the output signal of the comparator 109. The output terminal Q of the flip-flop FF is connected to a driver 118 to control a magnet MG3 for a trailing curtain of the shutter and to thereby define a shutter time.

Further included in the ciruit arrangement are a battery BAT, a transistor TR; and a power supply switch SW1 which turns on, for example, in response to the first stroke on a shutter release button. With the SW1 turned on, the transistor TR produces a voltage Vcc and the whole circuit is supplied with the power source voltage. The output signal of the flip-flop FF is at a high level during the shutter release control. With the output signal of the flip-flop FF at a high level, the transistor TR is turned on through an inverter I2. During the release control, therefore, the voltage is continuously supplied to the circuit even after the release button is released.

The circuit arrangement further includes a light sensitive element 115, such as CCD, and an AP circuit 113 which computes and processes the output of an A-D converter 114, which A-D converts a picture image produced from a light sensitive element 115 and a control circuit arranged to control the light sensitive element 115. The AF circuit 113 uses the clock pulsed CLK as basic clock and produces clock pulses CCLK which control the light sensitive element (CCD) 115. The circuit 113 further produces a signal INT which renders the CCD of the light sensitive element 115 charged. Upon completion of a charging process of the CCD, the light sensitive element 115 transmits a signal END to the circuit 113 to make the signal INT low level at that time. With the charging process of the CCD completed, the accumulated electric charge thus obtained is transferred by means of the clock pulses CCLK, one after another. Each charge thus transferred is A-D converted by the A-D converter 114. Then, the digital value thus obtained is supplied as a signal to the circuit 113. The AF circuit 113 computes the signal by a known operation method to detect a focal point. The output of the circuit 113, which is thus produced, is transmitted to a motor driver 116 which drives a lens. In response, the motor driver 116 controls a focusing motor 117 which is provided to shift the focal point of the lens. The AF circuit 113 thus performs a control action always bringing the lens 2 into an in-focus position. The AF circuit 113, the light sensitive element (CCD) 115, the A-D converter 114, the motor driver 116 and the motor 117 jointly form an AF action control circuit. However, this AF action control circuit is known. Therefore, the details are omitted from the description herein. The terminal EN of the motor driver 16 is connected to the output terminal Q of the flip-flop FF. The motor driver 116 thus becomes operative only when the output Q of the flip-flop is high (i.e., before shutter release). During shutter control, therefore, the focusing motor remains inoperative. The output Q of the flip-flop FF is supplied to a NOR circuit NOR 1. During shutter control, the clock pulses CLK are not allowed by the AND gate 1 to be supplied to the counter 120 and light measurement information is stored there.

A low brightness signal from the comparator 103, the output of the inverter I2 and the signal INT from the control circuit 113 are supplied to an AND circuit AND 3. The output level of the AND circuit AND 3 becomes high only when the CCD of the light sensitive element 115 is being charged and the brightness of an object to be photographed is low while no shutter release action has been initiated as yet. This output signal of the AND circuit AND 3 is supplied through a resistor R4, a terminal AF1 of a hot shoe 121 and a terminal AF2 disposed at the mount part of the auxiliary light adapter to a light emitting element 122 which is disposed within the auxiliary light adapter. The element 122 thus emits a light by this output signal of the AND circuit AND 3. Meanwhile, the output of the AND circuit AND 3 is also supplied to the NOR gate NOR 1 to inhibit the clock pulse input of the up-down counter 120 for the purpose of lessening the adverse effect of the auxiliary light on the brightness of the object to be photographed.

Such being the arrangement, the A-D converter ADC is rendered inoperative to inhibit any light measuring action during an auxiliary light emitting action. Conversely, the auxiliary light emitting action is inhibited during the light measuring action.

The auxiliary light adapter is provided with an accessory shoe 300, which permits a flash device 301 to be mounted thereon. With the flash device 301 mounted on this shoe 300, a synchronizing switch SWX is connected to a trigger circuit of the flash device through a terminal X1 of the hot shoe 121 of the camera, a terminal X2 of the mount part of the auxiliary light adapter, a terminal X3 of the shoe part of the adapter and a terminal X4 of the amount part of the flash device. Furthermore, the synchronizing switch SWX is also connected to a charge completion detection circuit disposed within the flash device through terminals cc and cc'. The arrangement permits the adapter to be mounted on the camera and further permits the flash device to be mounted on the adapter, so that an AF action and flash photography can be accomplished employing the auxiliary illumination device 4.

When the auxiliary light adapter or the auxiliary illumination device 4 is mounted on the shoe 302 of the flash device 301 with the flash device 301 mounted on the shoe of the camera, the light emitting element 122 of the adapter is connected to the AND gate AND 3 of the camera through the terminal AF1 of the shoe of the camera, the terminal AF3 of the flash device 4, the terminal AF4 of the shoe part of the flash device 4 and the terminal AF2 of the adapter. Therefore, this permits an AF action and flash photography with auxiliary illumination effected by mounting the adapter on top of the flash device 4.

In accordance with the invention, a mount part 5e for the auxiliary light adapter may be provided at the fore end part 2 of a photo-taking lens 2, as shown in FIG. 4. This arrangement permits mounting of a ring light device for close-up photography, etc. The signal pin 7d provided at the mount part 5e permits mounting without any cord for ease of handling.

The above arrangement has the auxiliary light device 4 attachable to and detachable from the camera without increasing the size of the camera. The device 4 can be mounted on the camera as an auxiliary light adapter only when it is required. A conventional accessory shoe, which is provided on the camera, may also be utilized as a mount part for mounting the adapter without providing any additional mount part. It is another advantage of the invention that the auxiliary light device 4 can easily be away from the photo-taking optical axis to prevent the auxiliary light flux from being eclipsed or shaded by the photo-taking lens 2.

This advantage can be more effectively attained by providing a mount part at the fore end of the photo-taking lens 2. Besides, this mount part and the signal pin also provided there can be used for other accessories such as a ring flash device, etc.

Furthermore, in accordance with the invention, the automatic focusing action and the light measuring action can be accomplished in a time seriated manner to prevent erroneous light measurement. Meanwhile, the automatic focusing and light measuring actions can be performed with the same ease of operation as the conventional camera without necessitating any additional operation by the photographer for enlarging the detectable range of the object's brightness while carrying out automatic focusing.

In the embodiment described above, priority is given to the automatic focusing mechanism 4 and, during the charging process thereof, the light measurement action is inhibited only during illumination by the auxiliary light. However, the invention is, of course, not limited to this and it is to be understood that modifications will be apparent to those skilled in the art without departing from the spirit of the invention. For example, where light measurement is to be carried out through A-D conversion of the double integration type, the AF sensor may be charged while it is separated from the light measurement output during the process of reverse integration. Furthermore, arrangement for circuit shifting such as light measurement AF—light measurement—AF, one after the other, can be made without difficulty in accordance with the invention.

What we claim:

1. A lighting device to be used in combination with a camera having an automatic focusing device for adjusting the focus on an object to be photographed, said automatic focusing device working prior to an exposure control operation of the camera, and said lighting device comprising:

(a) a mount part which is attachable to a shoe part of said camera, wherein said shoe part of the camera is provided at a position above a pentagonal part of the camera and said mount part has a signal terminal which can be connected to a signal pin provided at the shoe part of the camera, further said signal pin is connected to a starting signal forming circuit which produces a starting signal prior to the exposure control operation of the camera; and
    (b) an emitting source for projecting light to an object in response to said starting signal received through said signal pin and said signal terminal; and
    wherein said automatic focusing device is of the accumulation type in which the operation of accumulating image signals is recycled, and said starting signal forming circuit produces said starting signal in such a way as to be in synchronism with the accumulating operation so that light is emitted from said emitting source at least during the image signal accumulating operation of said focusing device.

2. An auxiliary light adapter to be used in combination with a photographic camera having an automatic focusing device for adjusting a focus on an object to be photographed, said auxiliary light adapter comprising:

(a) a mount part which is attachable to a shoe part of said camera, said mount part being provided with a signal terminal which can be connected to a signal pin provided at the shoe part of the camera;
    (b) a light emitting light source which emits a light to illuminate the object in response to an auxiliary light signal received through said signal pin and said signal terminal; and
    (c) a mounting shoe part provided on the upper surface of the casing of the adapter for mounting a flash device on top of the adapter.

3. An auxiliary light adapter to be used in combination with a photographic camera having an automatic focusing device for adjusting a focus on an object to be photographed, said auxiliary light adapter comprising:

(a) a mount part which is attachable to a shoe part of said camera, said mount part being provided with a first signal pin and a second signal pin which are arranged to be connected respectively to an auxiliary light signal pin and a synchronizing switch pin which are disposed at the shoe part of the camera;
    (b) a light emitting light source which emits a light to illuminate the object in response to an auxiliary light signal received through said auxiliary light signal pin and said first signal pin; and
    (c) a mounting shoe part provided on the upper surface of the casing of the adapter for mounting a flash device on top of the adapter, said mounting shoe part being provided with a third signal pin which is connected to said second signal pin, said adapter being arranged such that, when a flash device is mounted on the adapter with the adapter mounted on said camera, a synchronizing switch signal is transmitted to the flash device through the synchronizing switch pin, the second signal pin and the third signal pin.

4. A lighting device which can be used in a camera system in which a shutter release action is carried out by an operation of an operating member and at the same time a focus detecting action is carried out in response to an operation of said operating member prior to said operation of the operating member for the shutter release action, comprising:

(a) a mount part which is attachable to a shoe part of said camera, wherein said shoe part of the camera is provided at a position above a pentagonal part of the camera and said mount part has a signal terminal which can be connected to a signal pin provided at the shoe part of the camera, further a signal from a signal forming circuit, which is produced by an operation of the operating member for performing the focus detecting action, is provided at said signal pin; and (b) an emitting source for projecting light to an object in response to said signal received through said signal pin and said signal terminal; and wherein said automatic focusing device is of the accumulation type in which the operation of accumulating image signals is recycled, and said signal forming circuit produces a signal so that light is emitted from an emitting source synchronously to the accumulating operation by said focusing device.

5. A photographic camera system, comprising:
A. a camera including:
(a) an automatic focusing device for adjusting a focal point;
(b) a signal forming circuit which forms an auxiliary light emission signal;
(c) a synchronizing switch; and
(d) a shoe part having a first signal output terminal for sending out said signal from said signal forming circuit and a second output terminal which is connected to said synchronizing switch;
B. an auxiliary light adapter including:
(a) a mount part provided with a first signal input terminal which is arranged to be connected to said first signal output terminal and with a second signal input terminal which is arranged to be connected to said second signal output terminal, said mount part being arranged to be attachable to the shoe part of the camera;
(b) an auxiliary light source connected to said first signal input terminal, said light source being arranged to emit an illumination light to illuminate an object to be photographed in response to said auxiliary light emission signal when the signal is received through said first signal input terminal; and
(c) a shoe part provided on the casing of the adapter, said shoe part being provided with a third signal output terminal which is connected to said second signal input terminal;
C. a flash device including:
(a) a mount part which is attachable either to the shoe part of said camera or to the shoe part of said auxiliary light adapter, said mount part of the flash device being provided with a third signal input terminal which can be connected either to the second signal output terminal of the shoe part of the camera or to the third signal output terminal of the shoe part of said adapter and with a fourth signal input terminal which can be connected to the first signal output terminal of the shoe part of the camera;
(b) a light emission circuit connected to said third signal input terminal; and
(c) a shoe part to which the mount part of said adapter can be attached, said shoe part being provided with a fourth signal output terminal which is connected to said fourth signal input terminal, said fourth signal output terminal being arranged to permit the first signal input terminal of the mount part of said adapter to be connected thereto.

6. A photographic camera system, comprising:
A. a camera including:
(a) an automatic focusing device for adjusting a focal point on an object to be photographed;
(b) a lens barrel;
(c) a signal forming circuit which forms an auxiliary light signal; and
(d) a shoe part disposed on said lens barrel, said shoe part being provided with a signal pin for sending out said auxiliary light signal.
B. an auxiliary light adapter including:
(a) a mount part to be mounted on said shoe part, said mount part being provided with a terminal which is arranged to be connected to said signal pin; and
(b) an auxiliary light source which emits a light to illuminate the object in response to said auxiliary light signal coming through said signal pin and said terminal.

7. A photographic camera system according to claim 5 or 6, wherein said auxiliary light signal is sent out when said automatic focusing device is in operation.

8. A control device for a camera system, said system performing, prior to the start of an exposure control, a focus detection for an object to be photographed by a passive type automatic focus detecting device, wherein said system projects the light from an auxiliary light source onto an object as illuminating light for the purpose of increasing the brightness of the object, thus illuminating the object with said illuminating light, further a light metering operation is performed, prior to the start of an exposure control in this system, for detection of the brightness information used in the exposure control, said system further comprising:
(a) signal forming means for producing, prior to an exposure control start, an actuating signal for actuating said auxiliary light source; and
(b) a prohibiting circuit for prohibiting a light metering circuit from performing a light metering operation during a period of time when said light source is operated.

9. The control device of claim 8, wherein said light metering circuit has a light receiving portion and storing means to which a signal corresponding to the output of said light receiving portion is transferred, whereby the light metering operation is prohibited by prohibiting the signal corresponding to the output of said light receiving portion from transferring to said storing means.

10. A camera system comprising:
(a) a light metering circuit for starting, prior to an exposure control start, a light metering operation for detection of brightness information to be used in the exposure control;
(b) a passive type focus detecting device for performing, prior to the exposure control start, a focus detecting operation;
(c) an auxiliary light source for projecting light onto an object to be photographed, said light source illuminating the object by said light for the purpose of increasing the brightness of the object;
(d) a signal forming circuit for producing, prior to the start of an exposure control, an output signal for actuating said auxiliary light source; and
(e) a prohibiting circuit for prohibiting said light metering circuit from performing a light metering operation during a period of time when said light source is operated.

11. The camera system of claim 10, wherein said auxiliary light source is constructed so as to be isolated from said camera.

12. The control device of claim 10, wherein said light metering circuit has a light receiving portion and storing means to which a signal corresponding to the output of said light receiving portion is transferred, whereby the light metering operation is prohibited by prohibiting the signal corresponding to the output of said light receiving portion from transferring to said storing means.

13. A camera system comprising an auxiliary light device, said device having an auxiliary light source for projecting the light onto an object prior to an exposure control start, wherein said light device projecting the light onto the object for the purpose of increasing the brightness of said object, said system comprising:
(a) a light metering circuit for starting, prior to an exposure control start, a light metering operation for detecting brightness information;
(b) passive type automatic focus detecting means for performing a focus operation, whereby when the light source emits light, said detecting means performs a focus detecting operation on the bases of light from the object illuminated with the light from said light source; and
(c) a control circuit for prohibiting the light metering operation when light from said light source is projected to the object.

14. The control circuit for a camera of claim 13, wherein said focus detecting means performs the focus detecting operation intermittently in the light metering step and said signal forming circuit produces the signal intermittently in synchronism with the focus detecting operation.

15. The control device of claim 13, wherein said light metering circuit has a light receiving portion and storing means to which a signal corresponding to the output of said light receiving portion is transferred, whereby the light metering operation is prohibited by prohibiting the signal corresponding to the output of said light receiving portion from transferring to said storing means.

16. A camera of the type including a passive type automatic detecting device in which, when light from an auxiliary light emitting means is projected to an object to be photographed, a focus detecting operation is carried out in response to detection of light from the object in the illuminated state, and said auxiliary light emitting means projects light to the object for the purpose of increasing the brightness of the object, including:
(a) a light metering circuit for performing a light metering operation to detect the brightness for use in exposure control; and
(b) a control circuit for prohibiting said light metering circuit from detecting brightness when said auxiliary light emitting means is in operation.

17. The control device of claim 16, wherein said light metering circuit has a light receiving portion and storing means to which a signal corresponding to the output of said light receiving portion is transferred, whereby the light metering operation is prohibited by prohibiting the signal corresponding to the output of said light receiving portion from transferring to said storing means.

18. A camera of the type which performs light metering with a light metering circuit, and is shiftable from a light metering step where the light metering is performed by a light metering circuit to an exposure controlling step where an exposure is controlled on the basis of a light metering value obtained in the light metering step, said camera comprising a passive type auto-focus circuit which performs an auto-focusing operation under the auxiliary light projected onto an object by an auxiliary light source during the light metering step, and means for prohibiting the light metering operation of the light metering circuit while the light source is illuminating, wherein said auxiliary light source projects light onto the object as illuminating light for illuminating said object for the purpose of increasing the brightness of the object.

19. A camera of the type which performs a light metering with a light metering circuit, and is shiftable from a light metering step where the light metering is performed by a lightmetering circuit to an exposure controlling step where the exposure is controlled on the basis of a light metering value obtained in the light metering step, said camera comprising a passive type auto-focus circuit which performs an auto-focusing operation under the auxiliary light projected onto an object from an auxiliary light source during the light metering step, and means for prohibiting the use of the light metering value of the light metering circuit during an illumination of the light source as the basis for the exposure control in the exposure control step, wherein said auxiliary light source projects the light onto the object as illuminating light for illuminating said object for the purpose of increasing the brightness of the object.

20. An automatic focusing system for a camera, comprising:
(a) focus detecting means for automatically carrying out a focus detection;
(b) an auxiliary light source for projecting auxiliary light onto an object;
(c) a light measuring circuit for measuring brightness level, the output of the measuring circuit being used for exposure control; and
(d) a control circuit for actuating said auxiliary light source at the time of said detecting action by said focus detecting means, said circuit being rendered operative when the measured light value of said light measuring circuit represents the low brightness level.

21. In a camera system consisting of a camera and an auxiliary lighting device which can be attached to said camera and projects auxiliary light onto an object at the time of a focus detection, the improvement comprising:
(a) focus detecting means for automatically carrying out a focus detection;
(b) a light measuring circuit for measuring brightness level, the outut of the measuring circuit being used for exposure control; and
(c) a control circuit for actuating said auxiliary light source at the time of said detecting action by said focus detecting means, said circuit being rendered operative when the measured light value of said light measuring circuit represents the low brightness level.

22. A control device for a camera system which has focus detecting means and an auxiliary light source for projecting auxiliary light onto an object and automatically carries out a focus detection by said focus detecting means, a light measuring circuit for measuring an object brightness, and an exposure control circuit for controlling an exposure on the basis of an output of the light measuring circuit, comprising:
(a) a control circuit for actuating said auxiliary light source at the time of said focus detecting action by said focus detecting means; and
(b) control means for allowing said control circuit to operate when the output of said light measuring circuit represents the low brightness level.

23. A camera system comprising:
(A) an auxiliary lighting device for projecting auxiliary light onto an object; and
(B) a camera including:
(a) a light measuring circuit for detecting a brightness of an object;
(b) focus detecting means for automatically carrying out a focus detection;
(c) an exposure control circuit for controlling the exposure on the bases of an output of said light measuring circuit; and
(d) a control circuit for actuating said auxiliary lighting device when said focus detecting means operates at the time of a low level of brightness is detected by said light measuring circuit.

24. A control device according to claim 22, wherein said auxiliary light source is provided as an auxiliary lighting device which can be mounted onto a camera.

25. An automatic focusing system for a camera, comprising:
(a) focus detecting means for automatically carrying out a focus detection;
(b) an auxiliary light source for projecting auxiliary light onto an object; and
(c) a control circuit for actuating said auxiliary light source at the time of said detecting action by said focus detecting means, said circuit operating at the time when there is a low brightness level, said control circuit placing the light source in an inactive state automatically upon completion of the automatic focus detecting operation.

26. In a camera system consisting of a camera and an auxiliary lighting device which can be attached to said camera and projects auxiliary light onto an object at the time of a focus detection, the improvement comprising:
(a) focus detecting means for automatically carrying out a focus detection; and
(b) a control circuit for actuating said auxiliary lighting device at the time of said detection by said focus detecting means, said circuit working at the time of a low brightness level, said control circuit placing the light source in an inactive state automatically upon completion of the automatic focus detecting operation.

27. A control device for a camera system which has focus detecting means and an auxiliary light source for projecting auxiliary light onto an object and automatically carrying out a focus detection by said focus detecting means, comprising:
(a) a control circuit for actuating said auxiliary light source at the time of said focus detecting action by said focus detecting means; and
(b) control means for allowing an operation of said control circuit at the time of a low brightness level, said control circuit placing the light source in an inactive state automatically upon completion of the automatic focus detecting operation.

28. A camera system comprising:
(A) an auxiliary lighting device for projecting auxiliary light onto an object; and
(B) a camera including:
(a) focus detecting means for automatically carrying out a focus detection; and
(b) a control circuit for actuating said auxiliary lighting device when said focus detecting means operates at the time of a low level of brightness, said control circuit placing the light source in an inactive state automatically upon completion of the automatic focus detection operation.

29. A camera using a focus detecting system which projects light from an auxiliary light source onto an object by a focus detecting means for carrying out a focus detection comprising:
(a) control means for actuating said auxiliary light source at the time when the focus detecting means is put into operation; and
(b) a control circuit for driving said control means at the time when the brightness level is low, said control circuit placing the light source in an inactive state automatically upon completion of the automatic focus detecting operation.

30. An automatic focusing system for a camera comprising:
(a) focus detecting means for automatically carrying out a focus detection;
(b) an auxiliary light source for projecting auxiliary light onto an object; and
(c) a control circuit for actuating said auxiliary light source when said detection action by said focus detection means is performed, said control circuit placing the light source in an inactive state automatically upon completion of the automatic focus detecting operations.

31. The system as in claim 30 wherein said focus detecting means is of the type in which focus detection is performed by accumulating image signals, and said light source enters an inactive state when the accumulating operation ends.

32. A camera system according to claim 13 or 16, wherein the light metering circuit has a light receiving circuit and an AD conversion circuit for AD converting the output of the light receiving circuit, and the control circuit prohibits the operation of the AD conversion circuit while the light is emitted from the light source.

33. A camera system according to claim 8, 10, 18 or 19, wherein the light metering circuit has a light receiving circuit and an AD conversion circuit for AD converting the output of the light receiving circuit, and the prohibiting circuit prohibits the operation of the AD conversion circuit while the light is emitted from the light source.

34. A camera system according to claim 18 or 19, wherein said light metering circuit has a light receiving portion and storing means to which a signal corresponding to the output of said light receiving portion is transferred, whereby the light metering operation is prohibited by prohibiting the signal corresponding to the output of said light receiving portion from transferring to said storing means.

* * * * *